(12) United States Patent
Miyasaka

(10) Patent No.: US 6,899,195 B2
(45) Date of Patent: May 31, 2005

(54) VEHICLE FRONT STRUCTURE

(75) Inventor: Hiroyuki Miyasaka, Kanagawa-ken (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 0 days.

(21) Appl. No.: 10/340,611

(22) Filed: Jan. 13, 2003

(65) Prior Publication Data

US 2004/0200659 A1 Oct. 14, 2004

(30) Foreign Application Priority Data

Feb. 1, 2002 (JP) .................................. P2002-025456

(51) Int. Cl.⁷ ............................................. B62D 21/00
(52) U.S. Cl. .................................................... 180/312
(58) Field of Search ................................ 180/311, 312, 180/299; 280/124.109, 781, 783, 785

(56) References Cited

U.S. PATENT DOCUMENTS

| | | | | |
|---|---|---|---|---|
| 4,440,435 A | * | 4/1984 | Norlin ................... | 296/187.09 |
| 4,909,565 A | * | 3/1990 | Harasaki et al. ....... | 296/187.09 |
| 5,882,064 A | * | 3/1999 | Emmons ................ | 296/193.04 |
| 6,099,039 A | * | 8/2000 | Hine .......................... | 280/781 |
| 2002/0040819 A1 | * | 4/2002 | Miyata ...................... | 180/68.5 |

FOREIGN PATENT DOCUMENTS

| | | |
|---|---|---|
| DE | 43 13 785 A1 | 11/1994 |
| DE | 199 06 682 A1 | 8/2000 |
| JP | UMH02-051927 | 4/1990 |
| JP | 07-187003 | 7/1995 |
| JP | 09-002335 | 1/1997 |
| JP | 09-011932 | 1/1997 |
| JP | 10-045020 | 2/1998 |
| JP | 10-316011 | 12/1998 |
| JP | 11-255146 | 9/1999 |
| JP | 2000-038159 A | 2/2000 |
| JP | 2000-203461 A | 7/2000 |

* cited by examiner

Primary Examiner—Faye M. Fleming
(74) Attorney, Agent, or Firm—McDermott Will & Emery LLP

(57) ABSTRACT

Front side members (11, 12) are formed with outward bent portions (11A, 12A) at the front sides. Bumper reinforcement (13) is formed with rear slant portions (13A) at the both ends. The front ends of the outward bent portions (11A, 12A) are connected with the rear slant portions (13A). Interference members (40) are formed on the rear side of the proximal portions of the outward bent portions (11A, 12A). The interference members (40) interfere with power unit (P) to restrict a deformation of the front side member at a collision. Side members (31) of a sub frame (30) are stronger than the outward bent portions (11A, 12A) and the front end positions (K1) of the outward bent portions (11A, 12A) are arranged on the inside in the vehicle width direction and on the rear side in the vehicle fore and aft direction of the front end positions (K2) of the outward bent portions (11A, 12A).

13 Claims, 24 Drawing Sheets

VEHICLE FRONT STRUCTURE

BACKGROUND OF THE INVENTION

This invention relates to a vehicle front structure for effectively absorbing collision energy.

Japanese Patent Application Laid-open No. 10-316011 shows a vehicle front structure for absorbing collision energy from a front side. This vehicle front structure is provided with a main member formed by reinforcing a front member to its middle portion and being slightly bent inwardly and a sub member extending obliquely outward providing an auxiliary rigidity to the main member. The main member and sub member form a Y-shape. In this vehicle front structure, while the main member absorbs low-level collision energy from a low-speed collision with a non-reinforced portion of the main member, a reinforced portion of the main member and the sub member absorb high-level collision energy from a high-speed collision.

SUMMARY OF THE INVENTION

However, in the vehicle front structure, the sub member outwardly extending from the main member absorbs collision energy in cooperation with the main member, and its collision absorbing effect is substantially limited to a front collision from a font side.

Thus, an efficient energy absorbing function cannot be expected when the sub member with the auxiliary rigidity receives collision energy in its axial direction from a collision from the oblique front side. Further, since the main member is bent obliquely inward, the collision load from the oblique front side acts as a bending force to the main member, and thus efficient energy absorption cannot be expected from the axial collapse of the front side member.

Consequently, an object of the present invention is to provide a vehicle front structure in which a sufficient collision absorbing function can be obtained by efficiently collapsing the front side member at both collisions from a substantially front side and an oblique front side.

To achieve the object of the present invention described above, there is provided a vehicle front structure comprising:

a pair of right and left front side members disposed on right and left sides of a vehicle front compartment and extending in a vehicle fore and aft direction, each front side member having an outward bent portion which is bent outward at a predetermined angle;

a bumper reinforcement connecting front ends of the front side members, having rearward slanting portions formed on both ends in a vehicle width direction, the rearward slanting portions bent obliquely rearward, the rearward slanting portions connecting with front ends of the outward bent portions;

a pair of right and left straight members extending in the vehicle fore and aft direction along with the front side members;

a power unit disposed between the front side members; and a pair of interference members disposed on rear sides of proximal portions of the front side members, respectively, the interference members abutting on the power unit as the front side members deforming inward, wherein first front end positions of the straight members are arranged on an inside in the vehicle width direction and a rear side in the vehicle fore and aft direction of second front end positions of the outward bent portions, a strength of the straight members being larger than that of the outward bent portions.

DETAILED DESCRIPTION OF PREFERRED EMBODIMENT

Figure 1:
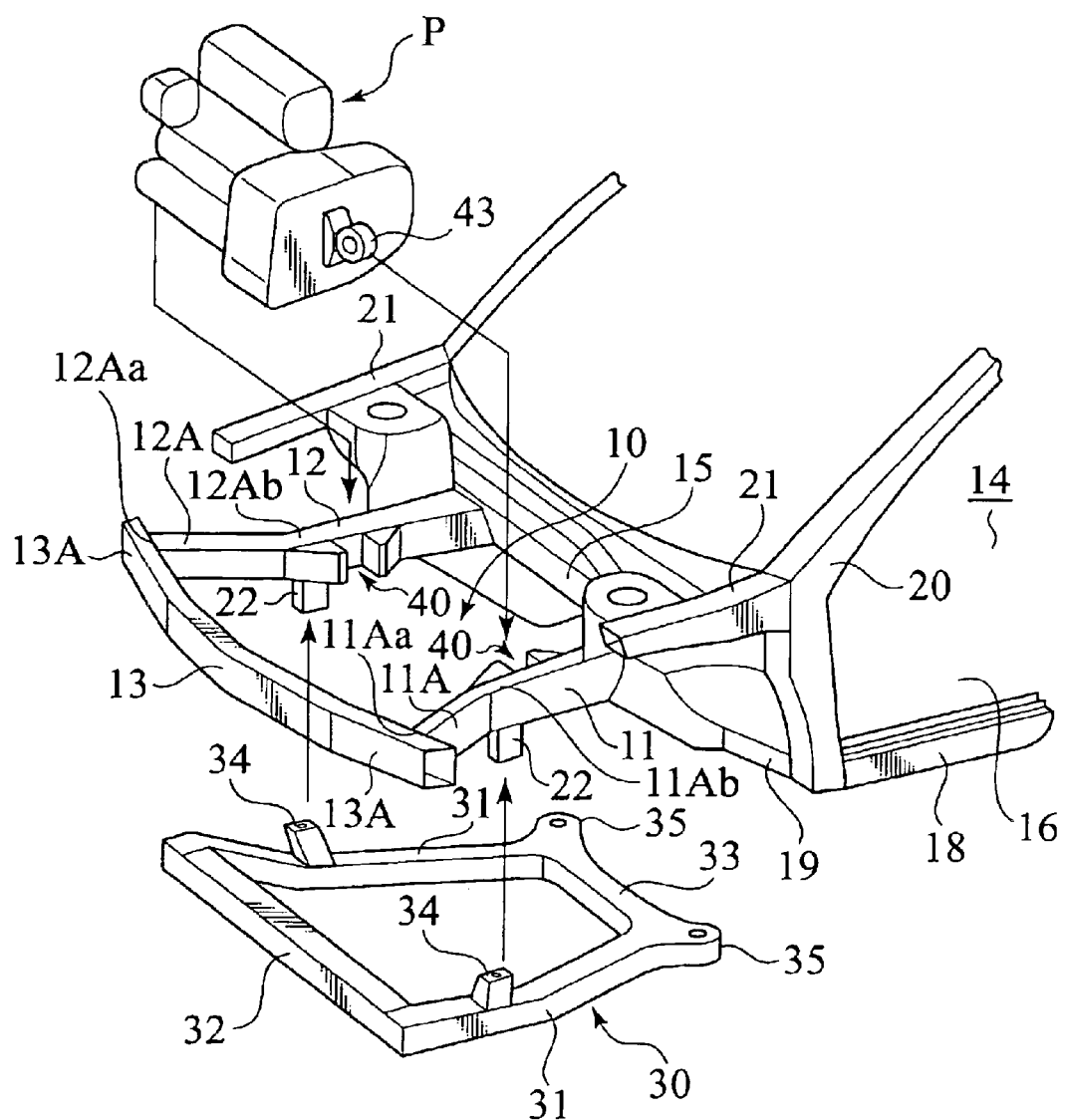
FIG. 1 is an exploded perspective view showing a frame structure of a vehicle front portion in a first embodiment of the present invention.
Figure 2:
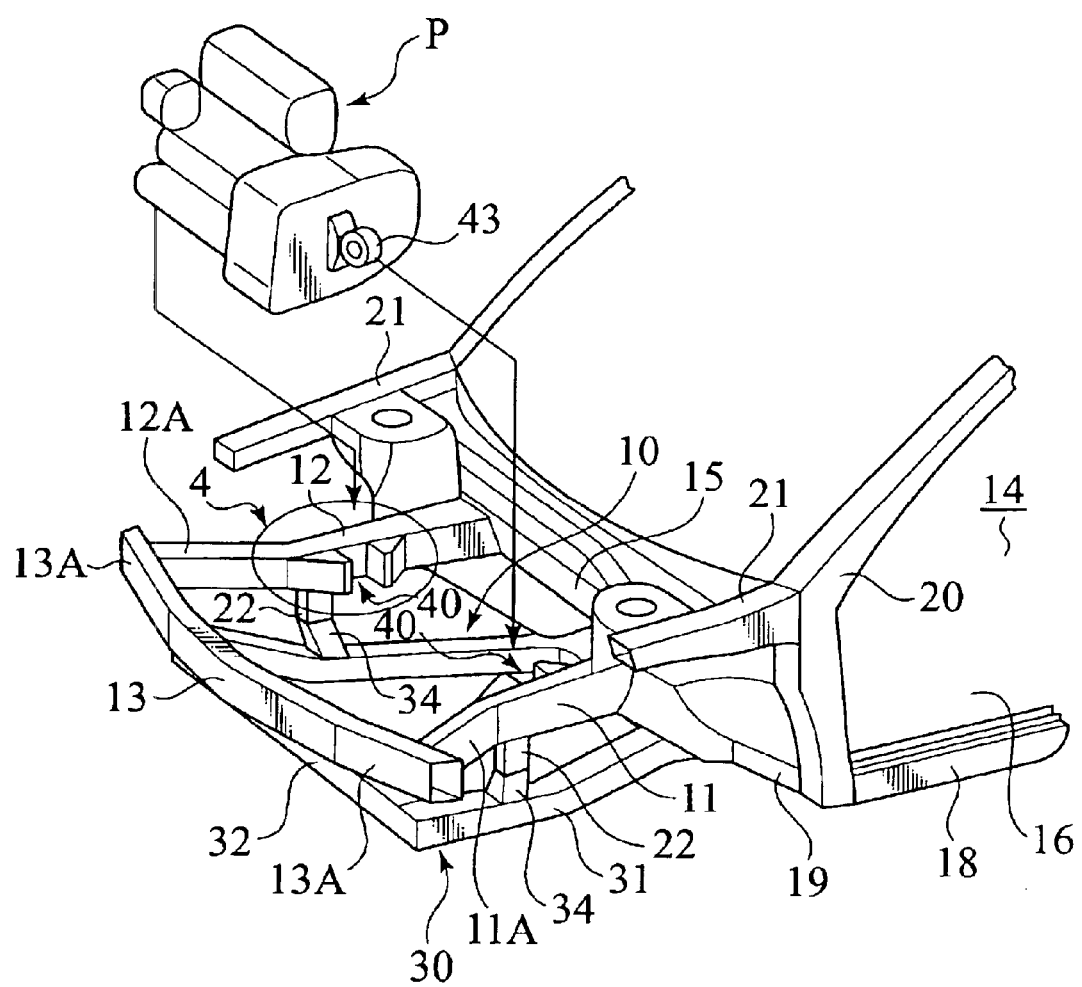
FIG. 2 is a perspective view showing the frame structure of the vehicle front portion in the first embodiment of the present invention.
Figure 3:
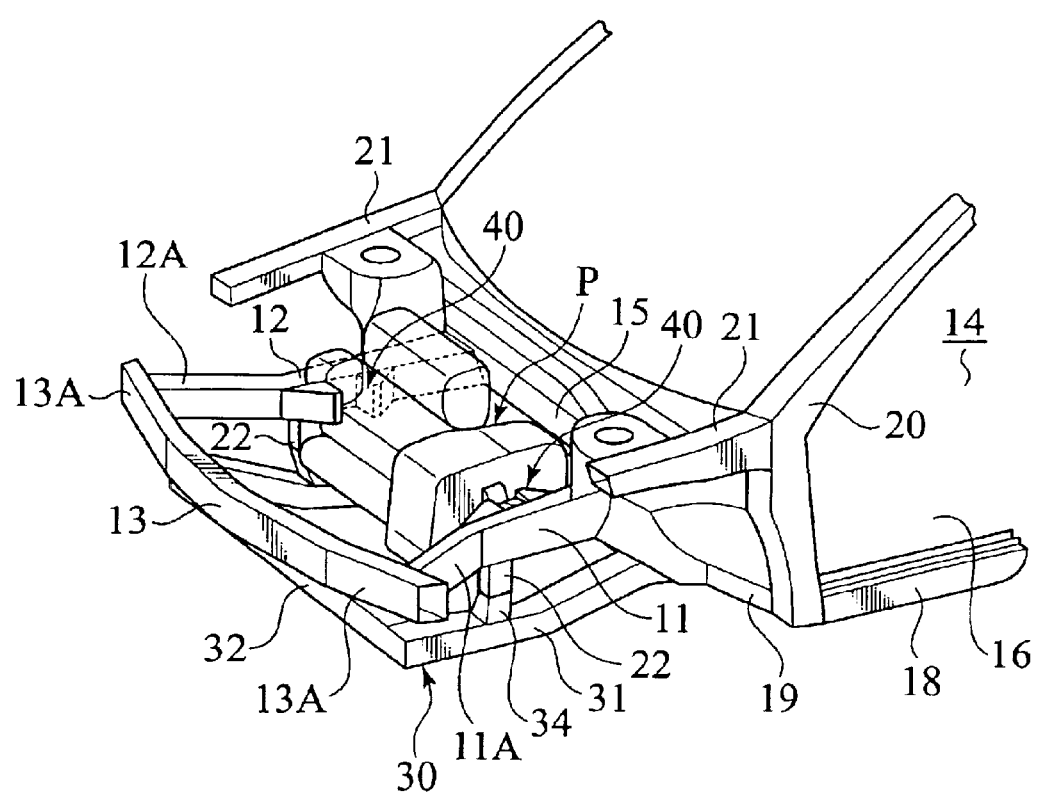
FIG. 3 is a perspective view showing the frame structure with a power unit of the vehicle front portion in the first embodiment of the present invention.

Now referring to FIGS. 1 to 3, a pair of right and left front side members 11, 12 are arranged on both side of the vehicle width direction of a front compartment 10. A bumper reinforcement 13 as a frame member of a front bumper connects the front end of the front side members 11, 12.

A pair of extension side members 17 are connected to the front side members 11, 12. The extension side members 17 extend under a dash panel 15 defining the front compartment 10 and a cabin 14, and further extend under a floor panel 16 and are connected to the floor panel 16. A pair of side sills 18 are arranged on the outside of and in parallel with the extension side members 17, respectively. Each side sill 18 is connected to the extension side member 17 at its front end.

A front pillar 20 rises from the front end of the side sill 18, and a hood ridge member 21 is extended forward from the middle of the front pillar 20. The front pillar 20 extends obliquely upward above the hood ridge member 21 to connect with the roof side rail.

A sub frame 30 is arranged under the front side members 11, 12. The sub frame 30 has a pair of side members (corresponding to straight members in the claims) 31, 31 extending in fore and aft directions along the front side member 11, 12, a front member 32 connecting the front ends of the side members 31, 31, and a rear member 33 connecting the rear ends of the side members 31, 31. The sub frame 30 has a frame shape composed of these members 31, 32, 33 in a plan view.

A pair of connecting portions 34 are formed on the upper face and on the central front portion of the side member 31, and opposite connecting portions 22 are formed on the lower surface and on the central portion of the front side members 11, 12. The sub frame 30 is connected with the front side members 11, 12 through the connecting portions 34, 22. Further, a pair of extension portions 35 extending outward obliquely and rearward from the rear end the side member 31 are connected with the under face of the front end of the extension side member 17, respectively.

Figure 4:
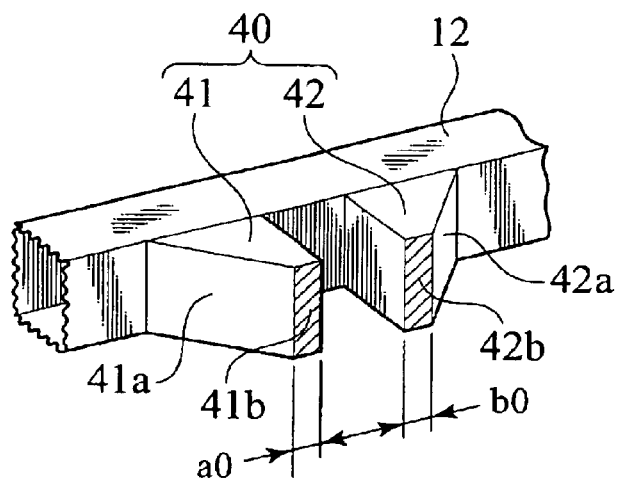
FIG. 4 is an enlarged view of portion 4 in FIG. 2.
Figure 5:
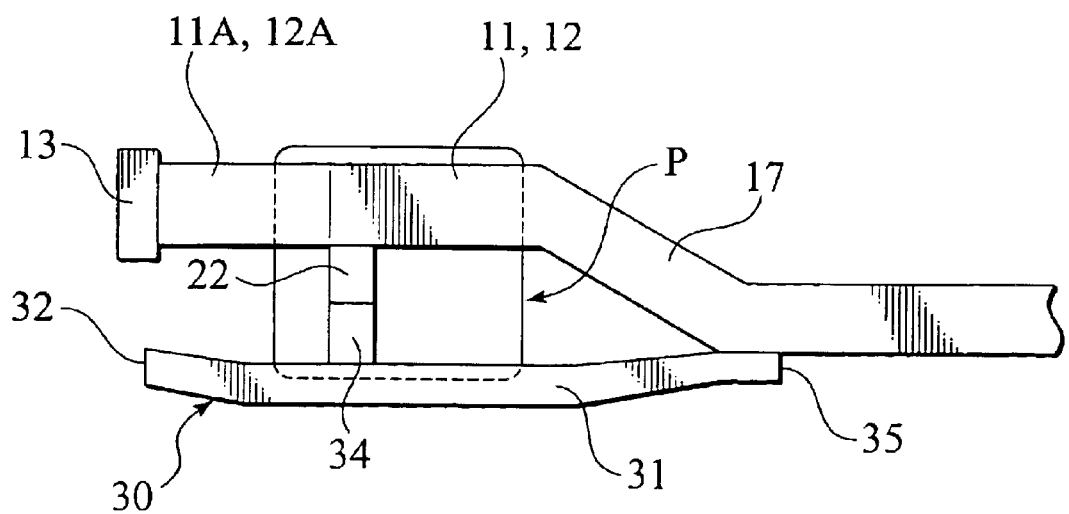
FIG. 5 is a side view showing the frame structure of the vehicle front portion in the first embodiment of the present invention.
Figure 6:
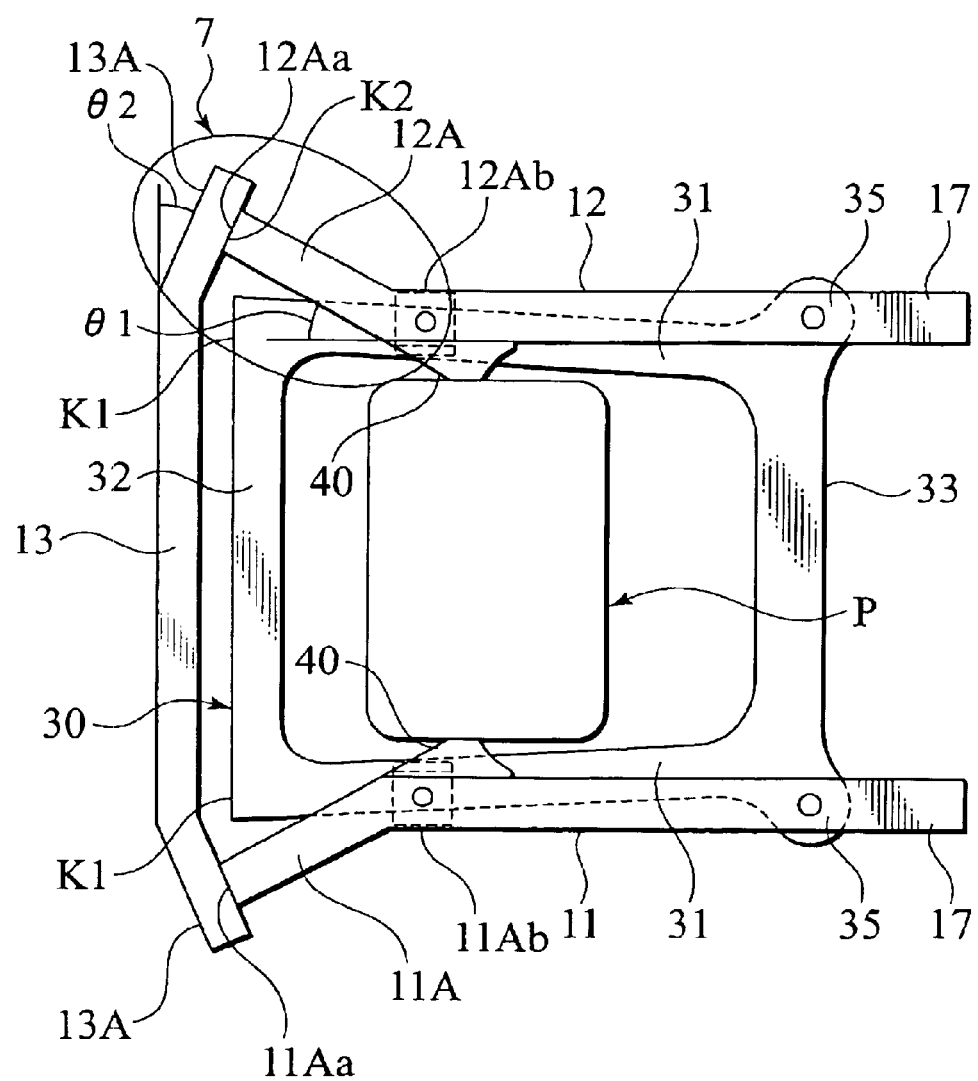
FIG. 6 is a plan view showing the frame structure of the vehicle front portion in the first embodiment of the present invention.

A pair of mount brackets 40, 40 (corresponding to interference members in the claims) are formed on the opposite inner faces on the middle of the front side members 11, 12, respectively, as shown in FIG. 4. As shown in FIGS. 3, 6, a power unit P is supported by the mount brackets 40, 40 so as to extend to the mount brackets 40, 40.

The mount brackets 40 are attached on the inner side of the front side member 11, 12 as shown in FIG. 4. Each mount bracket 40 is composed of a front side member 41 and a rear side member 42. A mount bush 43 is arranged between and attached to these front side member 41 and rear side member 42.

A front side face 41a of the front side member 41 is formed obliquely outward in the vehicle width direction, and a rear side face 42a is formed obliquely outward in the vehicle width direction. Thus, in a plan view, these front and rear side members 41, 42 are formed in a trapezoidal shape. The front and rear side members 41, 42 are formed with interference surfaces 41b, 42b, respectively. The interference surfaces 41b, 42b have plane surfaces having widths a0, b0 at their inner side tip in the vehicle width direction, respectively.

Figure 7:
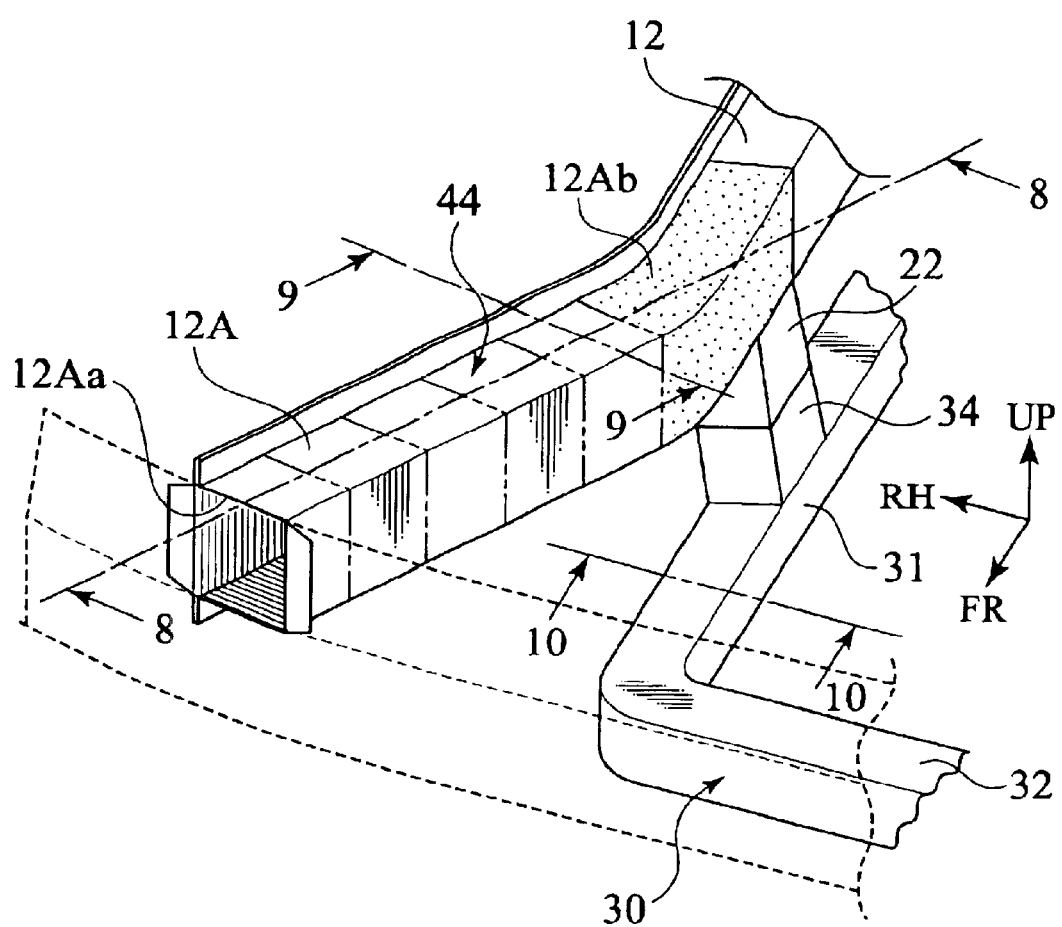
FIG. 7 is an enlarged view of portion 7 in FIG. 6.

As shown in FIGS. 6, 7, outward bent portions 11A, 12A are formed on the front ends of the front side members 11, 12. These outward bent portions 11A, 12A are bent outward in the vehicle width direction at a predetermined angle θ1. This bending angle θ1 of the outward bent portions 11A, 12A is set in view of a load input direction at a collision from the oblique front side.

Figure 8:
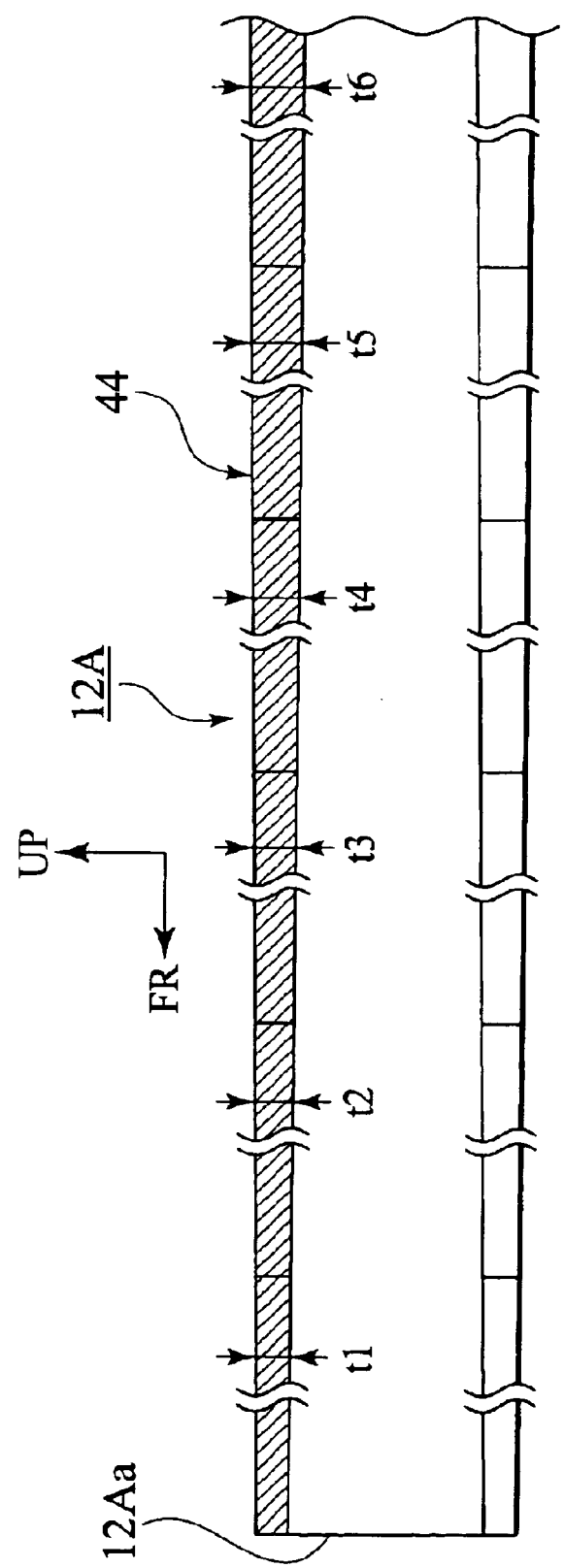
FIG. 8 is an enlarged cross sectional view taken along the line 8—8 in FIG. 7.
Figure 9:
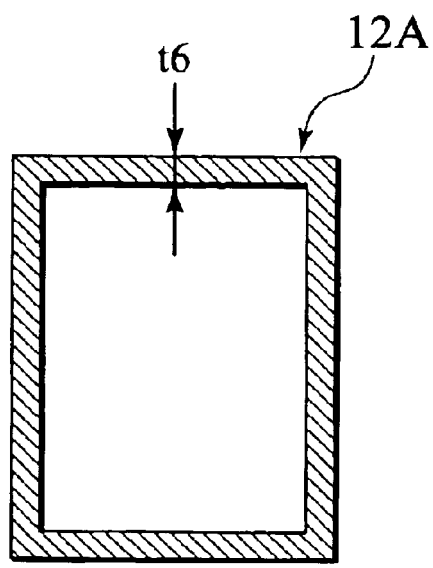
FIG. 9 is an enlarged cross sectional view taken along the line 9—9 in FIG. 7.

As shown in FIGS. 8, 9, the outward bent portions 11A, 12A increase in their wall thickness t1, t2, t3, t4, t6 (t1 means a wall thickness of the distal end 11Aa, 12Aa, t6 means a wall thickness of the proximal portions 11Ab, 12Ab) from the distal ends 11Aa, 12Aa to the proximal portions 11Ab, 12Ab (t1<t2<t3<t4<t5<t6) to form a strength changing structure 44. In this strength changing structure, the strength of the outward bent portions 11A, 12A increase from the distal ends 11Aa, 12Aa to the proximal portions 11Ab, 12Ab.

The mount brackets 40 and the connecting portions 22 are arranged on the rear side of and close to the proximal portions 11Ab, 12Ab which are the thickest. Further, the mount brackets 40 and the connecting portions 22 are arranged close to each other.

As shown in FIG. 6, the bumper reinforcement 13 is provided with rearward slanting portions 13A which are formed by bending both ends of the bumper reinforcement 13 rearward at a determined angle θ2. The outward bent portions 11A, 12A are connected at their front ends to the rear face of the rearward slanting portions 13A at substantially right angle.

In this embodiment, the side members 31 of the sub frame 30 extend straight along the front side members 11, 12. The front end positions (corresponds to first front end positions in the claims) K1 of the side members 31 arranged inside in the vehicle width direction and rear side of the front end position (corresponds second front end positions in the claims) K2 of the front side members 11, 12.

In addition, as shown in FIG. 9, the thickest portion of the outward bent portions 11A, 12A has a rectangular shaped close sectional structure with a wall thickness t6. The side member 31 of the sub frame 30 has a rectangular shaped close sectional structure with a wall thickness t7. The wall thickness t7 of the side member 31 is larger than the wall thickness t6 of the outward bent portions 11A, 12A (t6<t7) so that the strength of the side member 31 is larger than that of the outward bent portions 11A, 12A.

Figure 11:
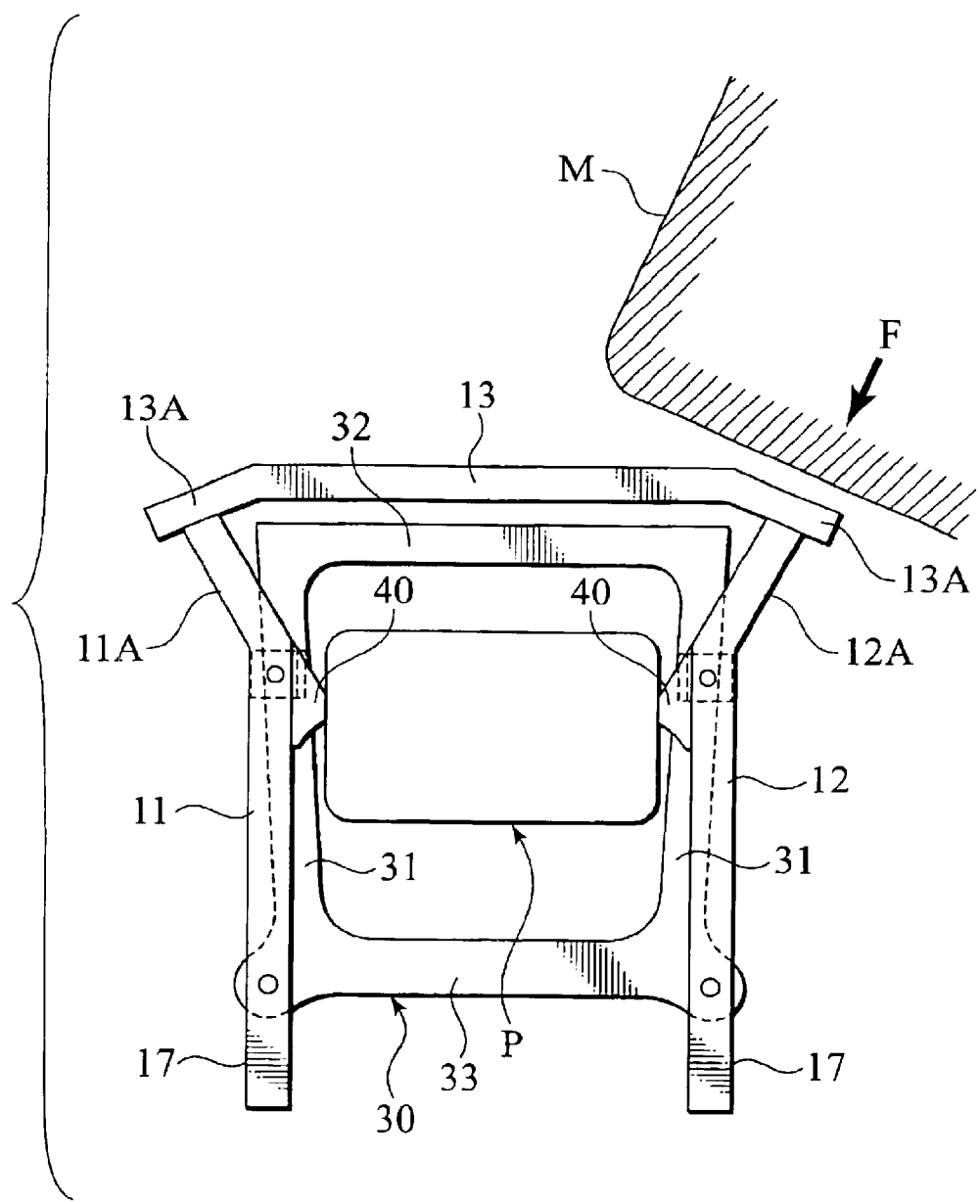
FIG. 11 is a plan view showing the frame structure of the vehicle front portion prior to a collision from an oblique front side in the first embodiment of the present invention.
Figure 12:
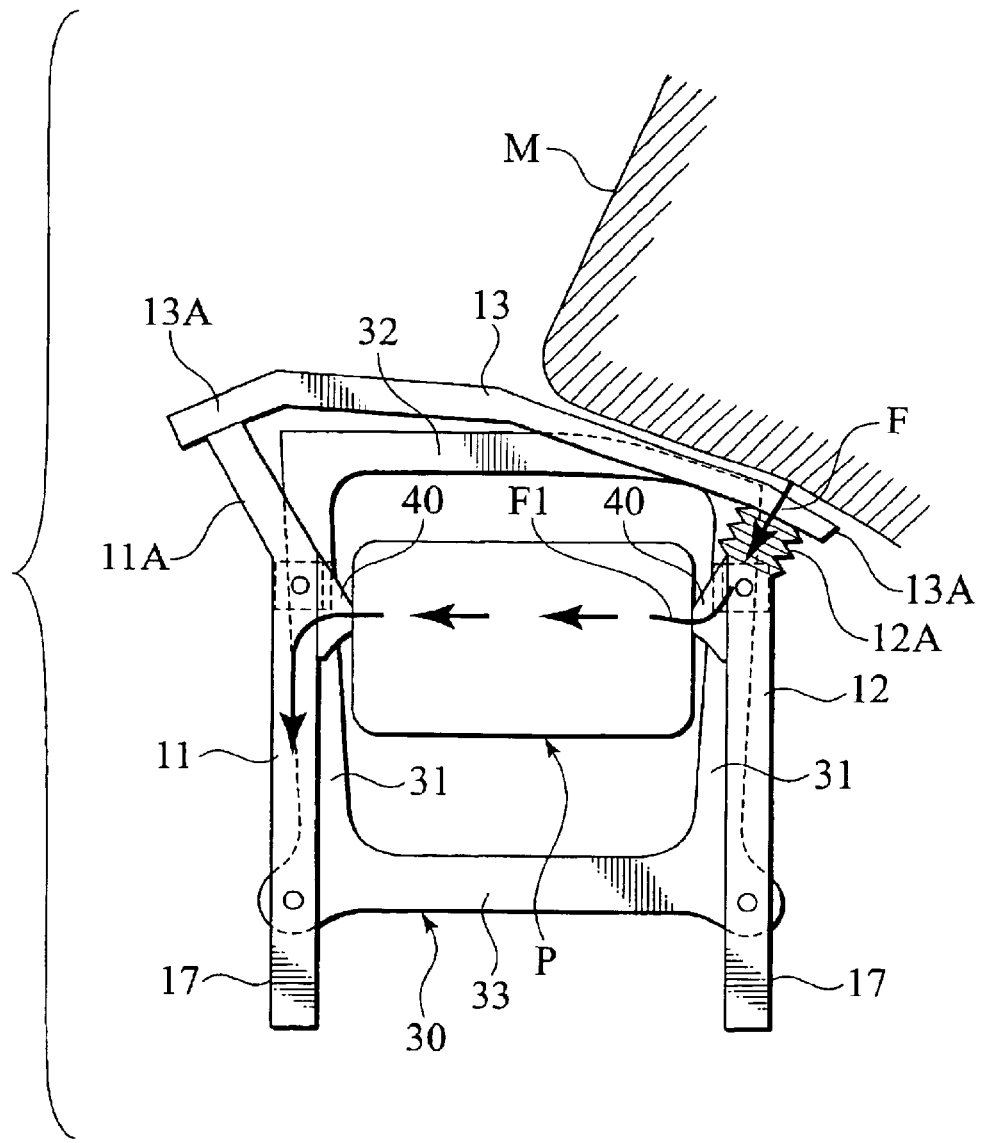
FIG. 12 is a plan view showing the frame structure of the vehicle front portion at a collision from an oblique front side in the first embodiment of the present invention.

With the structure described above, as shown in FIG. 11, if another vehicle collides into the right oblique front side of the vehicle, a collision load F is received to the right oblique front side. The collision load F, as shown in FIG. 12, collapses the right rearward slanting portion 13A of the bumper reinforcement 13, to be further applied to the outward bent portion 12A on the front end of the front side member 12 in its axial direction.

At this moment, the mount bracket 40 is provided on the inner side of the front side member 12 close to the proximal portion 12Ab of the outward bent portion 12A and the connecting portion 22 for the sub frame 30 is provided on the under side of the front side member 12 close to the mount bracket 40 to form strong structure. Further, front side member 12 is restricted to deform inside in the vehicle width direction by the power unit P through the mount bracket 40. The proximal portion 12Ab of the outward bent portion 12A is prevented from bending due to the collision load F from the oblique front side.

As a result, the outward bent portion 12A is axially collapsed. Further, as the collision proceeds, the front end position K1 of the side member 31 of the sub frame 30 becomes a fulcrum, and the rearward slanting portion 13A of the bumper reinforcement 13 and the opposite vehicle M form a collision face substantially perpendicular to the outward bent portion 12A as the bumper reinforcement 13 bends. Consequently, the collision load F can be axially applied to the outward bent portion 12A at the end of the collision.

Thus, the outward bent portion 12A can be steadily axially collapsed to efficiently absorb collision energy.

Further, though the front side member 12 is apt to deform inward entirely in the vehicle width direction, as shown in FIG. 12, the deforming force F to the front side member 12 is transmitted to the power unit P through the mount bracket 40. Further, the deforming force F is transmitted to the other front side member 11, which is arranged on the non-collision side, through the power unit P, so that the collision load can be dispersed to the whole frame structure of the vehicle front portion to suppress the deformation of the cabin 14.

Figure 13:
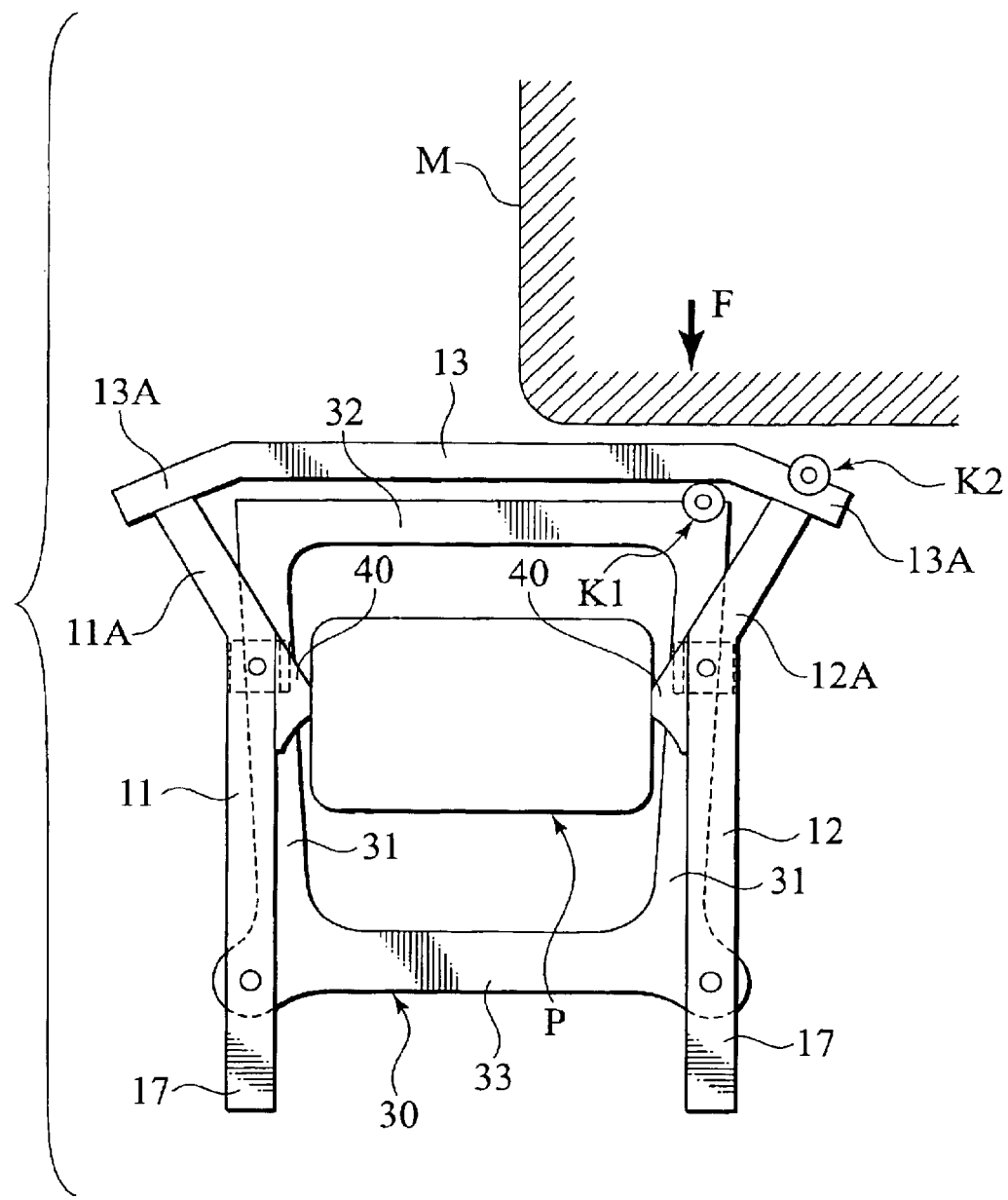
FIG. 13 is a plan view showing the frame structure of the vehicle front portion prior to a collision from a front side in the first embodiment of the present invention.
Figure 14:
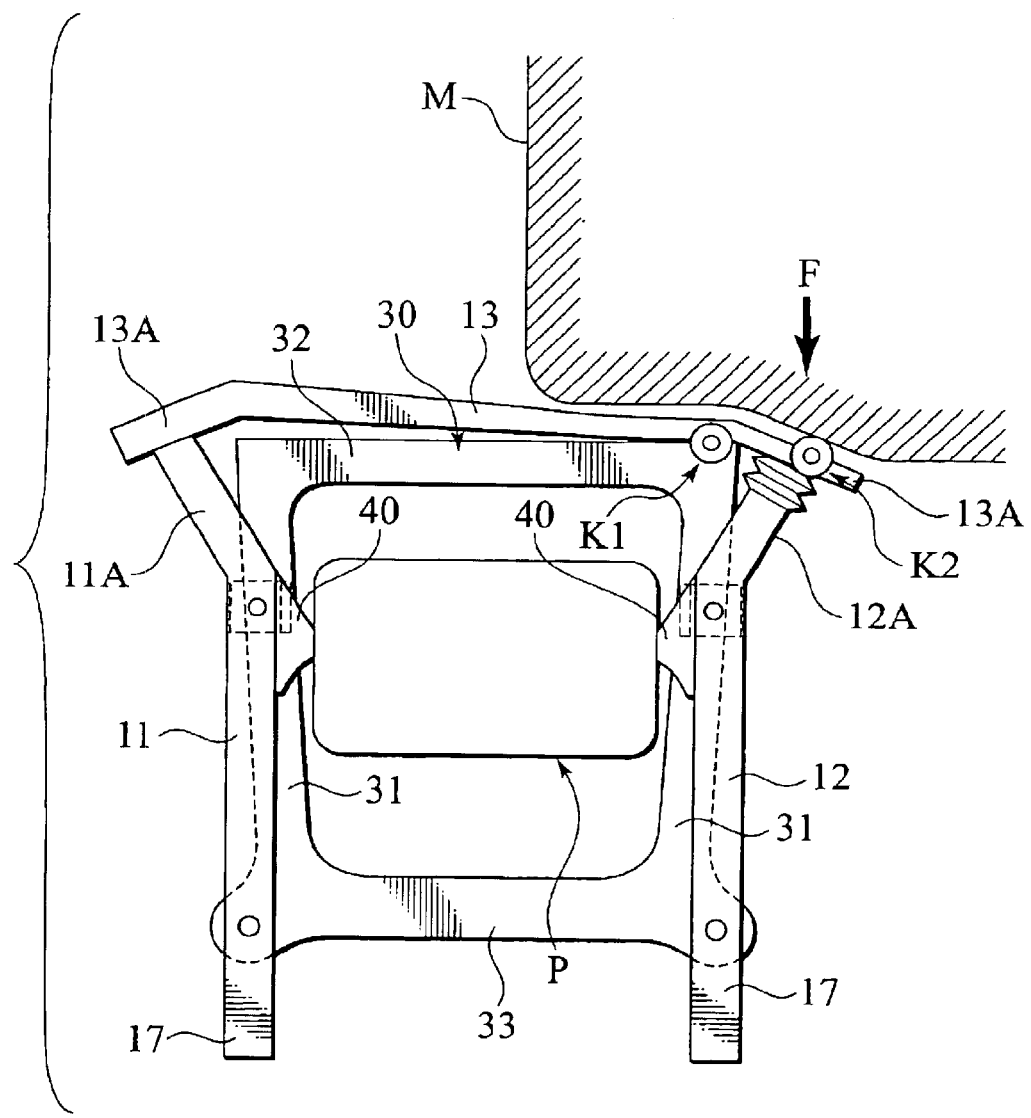
FIG. 14 is a plan view showing the frame structure of the vehicle front portion at the beginning of a collision from a front side in the first embodiment of the present invention.

As shown in FIG. 13, when the vehicle receives an offset collision load F from substantially front side, the collision load F partially acts on the right or left side of the bumper reinforcement 13. When the collision side (right side in this embodiment) of the bumper reinforcement 13 is pressed by the opposite vehicle M, as shown in FIG. 14, the other side (left side in FIG. 14) of the bumper reinforcement 13 becomes a fulcrum so that the right side of the bumper reinforcement 13 inclines. Thus, the rearward slanting portion 13A on the right side of the bumper reinforcement 13 further moves rearward, so that the collision load F acts on the outward bent portion 12A connected to the rearward slanting portion 13A in the axial direction of the outward bent portion 12A. Thus, the outward bent portion 12A can efficiently absorb the collision energy by its axial collapse behavior.

Concretely, as shown in FIG. 14, at the beginning stage of the collision, since the front position K2 of the outward bent portion 12A is positioned on the front side of the front position K1 of the side member 31 of the sub frame 30, the sub frame 30 does not effect the deformation of the outward bent portion 12A, thus the outward bent portion 12A can start to steadily axially collapse to efficiently absorb a collision energy.

Figure 10:
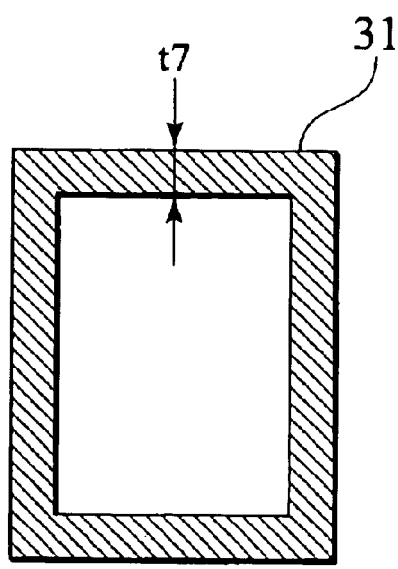
FIG. 10 is an enlarged cross sectional view taken along the line 10—10 in FIG. 7.
Figure 15:
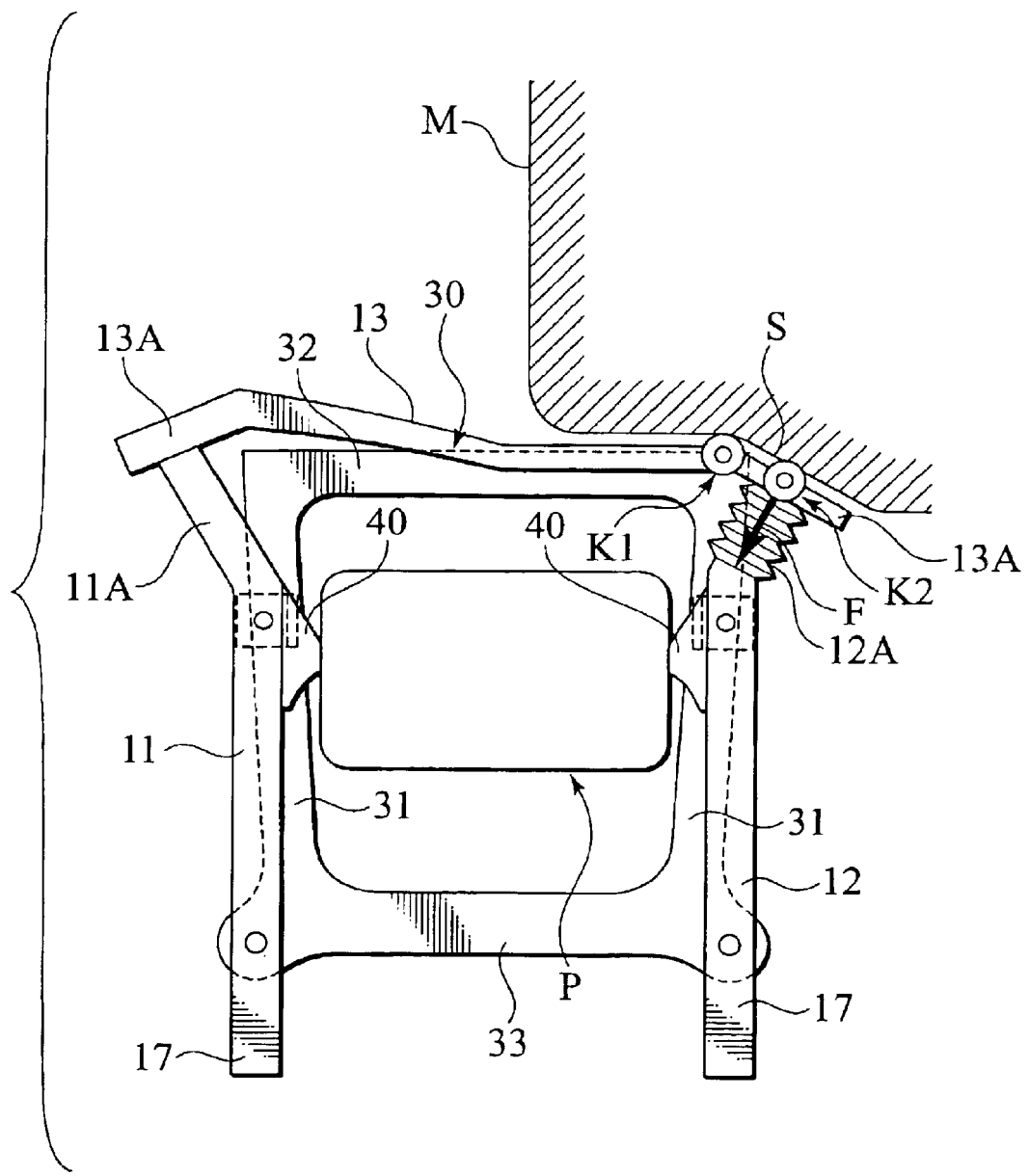
FIG. 15 is a plan view showing the frame structure of the vehicle front portion in the middle of a collision from a front side in the first embodiment of the present invention.

Further, as the deformation proceeds, as shown in FIG. 15, the front position K2 of the outward bent portion 12A coincides with the front position K1 of the sub frame 30. Then, as shown in FIGS. 9, 10, since the wall thickness t7 of the side member 31 is larger than the wall thickness t6 of the outward bent portion 12A and the side member 31 is stronger than the outward bent portion 12A, the front position K1 of the side member 31 becomes a fulcrum. Thus, the rearward slanting portion 13A of the bumper reinforce 13 with the opposite vehicle M form a collision face S substantially perpendicular to the outward bent portion 12A as the bumper reinforcement 13 bends.

Thus, the collision load F acts on the outward bent portion 12A in the axial direction through the collision face S.

Consequently, even if a substantial front collision occurs, the outward bent portion 12A can efficiently absorb the collision energy with its axial collapse behavior.

Further, even if a substantial front collision occurs, since the mount bracket 40 and the connecting portion 22 are arranged close to the proximal portion 12Ab of the outward bent portion 12A and the front side member 12 is restricted by the power unit P through the mount bracket 40, the outward bent portion 12A can steadily axially collapse without bending in its middle portion.

Further, when the front side member 12 receives the collision load F from the substantial front side through the outward bent portion 12A, the front side member 12 is apt to deform inward in the vehicle width direction similar to the oblique front collision as shown in FIG. 12. In this case, as shown in FIG. 16, the deforming force F2 to the front side member 12 is transmitted to the other front side member 11, which is arranged on the non-collision side, through the mount bracket 40 and the power unit P, so that the collision load can be dispersed to the whole frame structure of the vehicle front portion.

In addition, the mount bracket 40 is composed of two members of the front side member 41 and the rear side member 42 which have a trapezoidal shape, increasing in width outward in the vehicle width direction in the plan view. Thus, when the load F1, F2 is transmitted from the front side member 12 to the power unit P acts on the mount bracket 40, the mount bracket 40 deforms so that the contact area with the power unit P increases.

Figure 17:
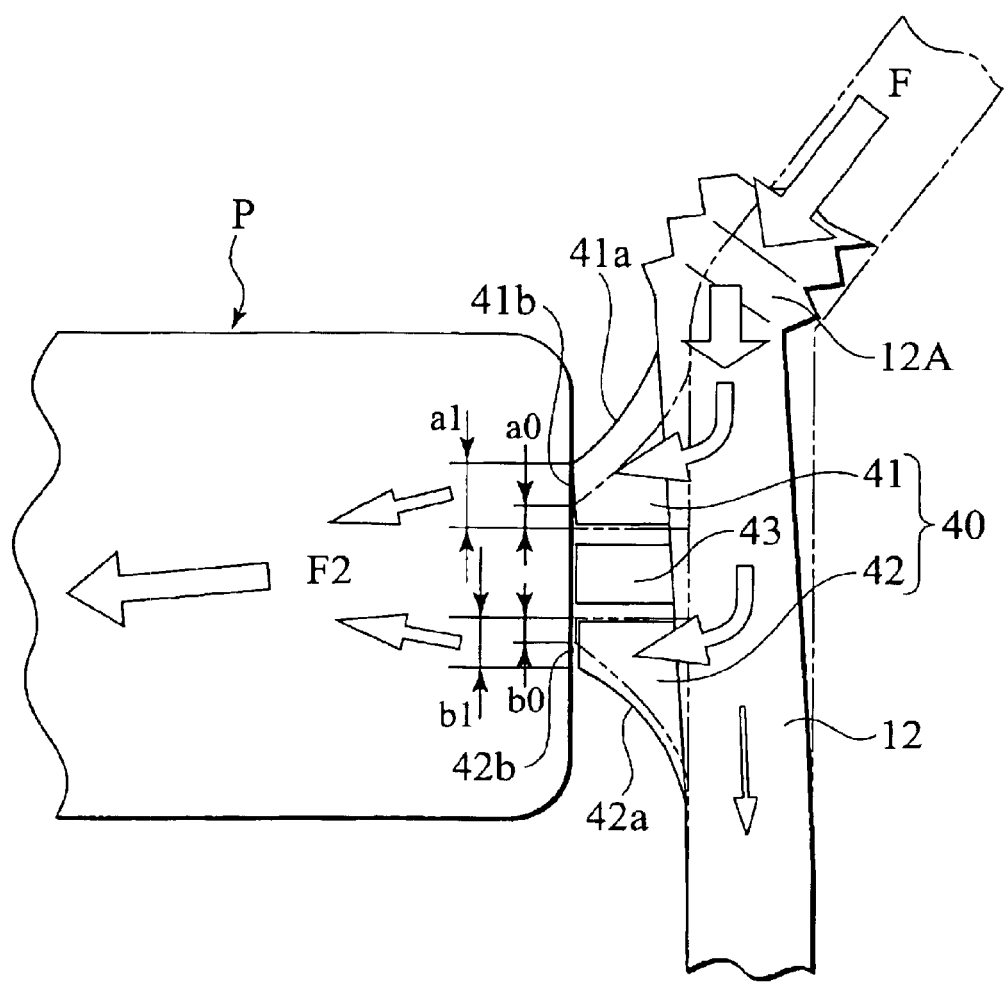
FIG. 17 is an enlarged plan view of a portion G in FIG. 16.

More concretely, as shown in FIG. 17, the interference surface 41b of the front side member 41 constituting the mount bracket 40 increases from the width a0 to width a1, and the interference surface 42b of the rear side member 42 increases from the width b0 to width b1. Thus, the interference surfaces 41b, 42b of the mount bracket 40 to the power unit P expand to improve the transmission efficiency of the load F1, F2.

Figure 16:
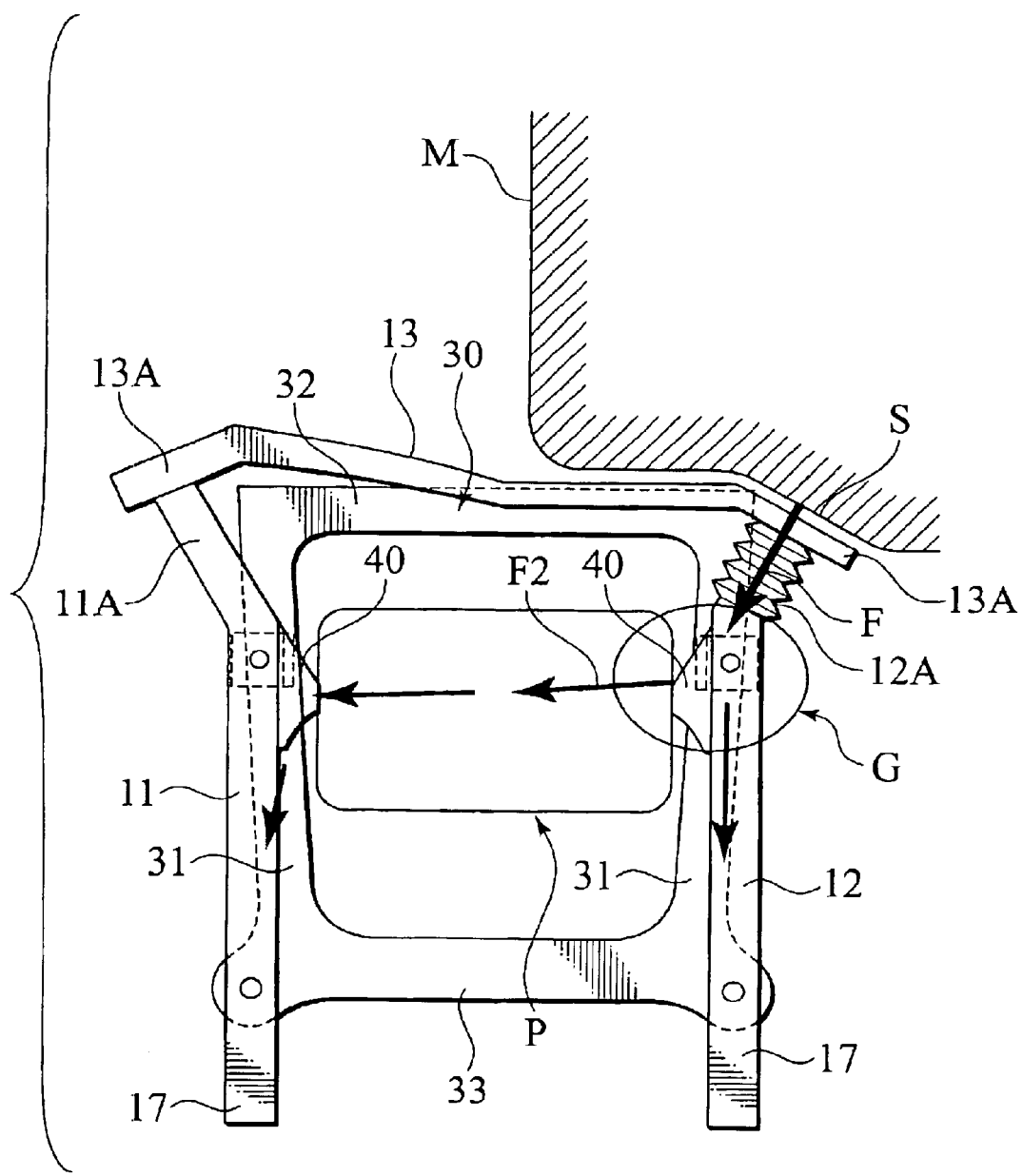
FIG. 16 is a plan view showing a communication route of the collision load in the frame structure of the vehicle front portion in a collision from a front side in the first embodiment of the present invention.

Further, at the oblique front collision as shown in FIG. 12 and the substantial front collision as shown in FIG. 16, the collision load F acting on the outward bent portion 12A is transmitted to the sub frame 30 through the connecting portion 22 and 34. Then, the collision load F is transmitted from the sub frame 30 to the extension side member 17 to improve the load dispersing effect of the collision load F.

Further, the outward bent portion 12A, as shown in FIG. 8, the wall thickness t1, t2, t3, t4, t5, t6 become gradually larger from the distal end 12Aa to proximal portion 12Ab to form the strength changing structure 44. Thus, even if the acting direction of the load shifts from the axial direction of the outward bent portion 12A, the outward bent portion 12A does not bend through the moment occurring in the proximal portion 12Ab to gradually axially collapse from the distal end 12Aa to the proximal portion 12Ab.

Figure 18:
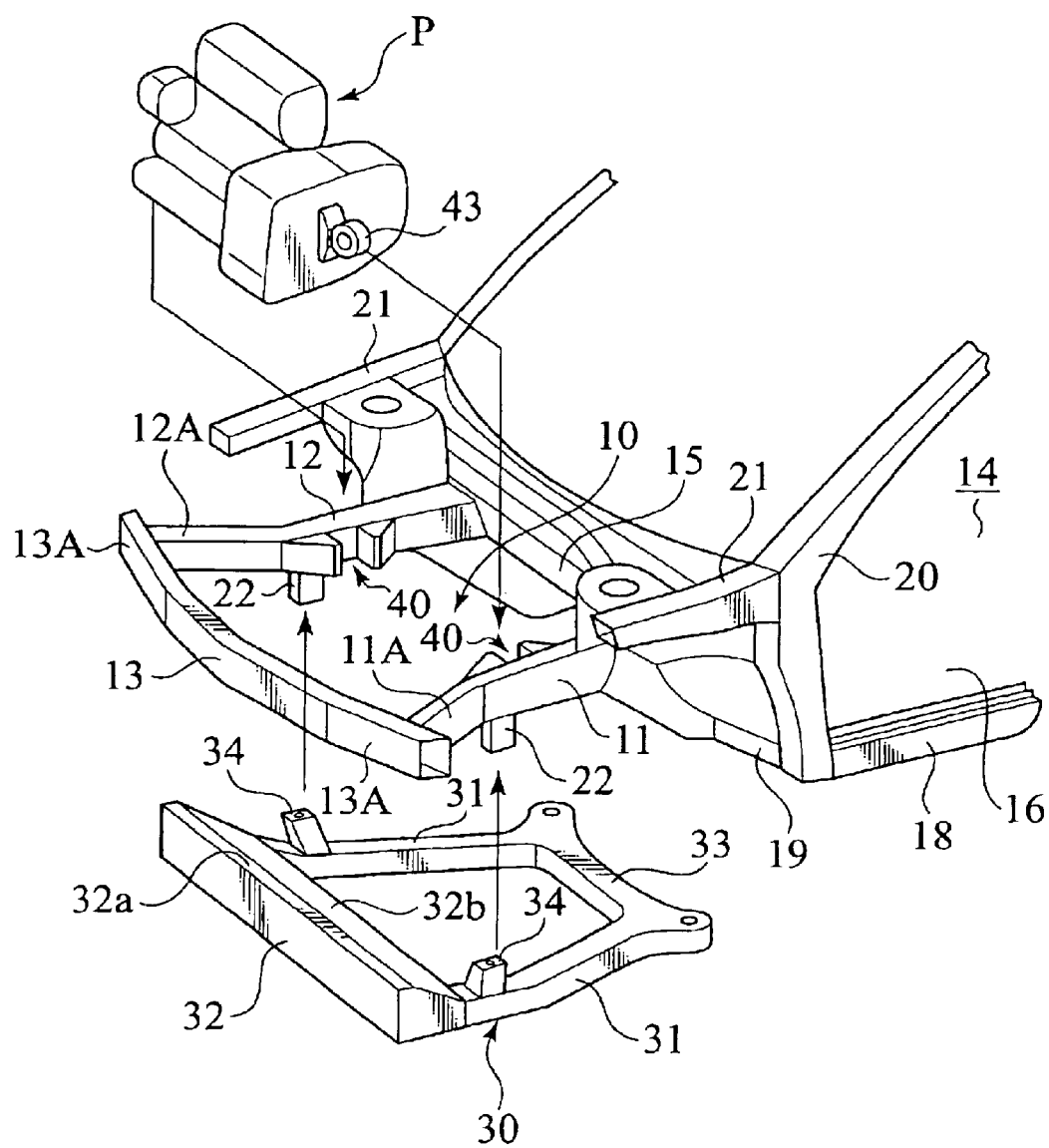
FIG. 18 is an exploded perspective view showing a frame structure of the vehicle front portion in the second embodiment in the present invention.
Figure 19:
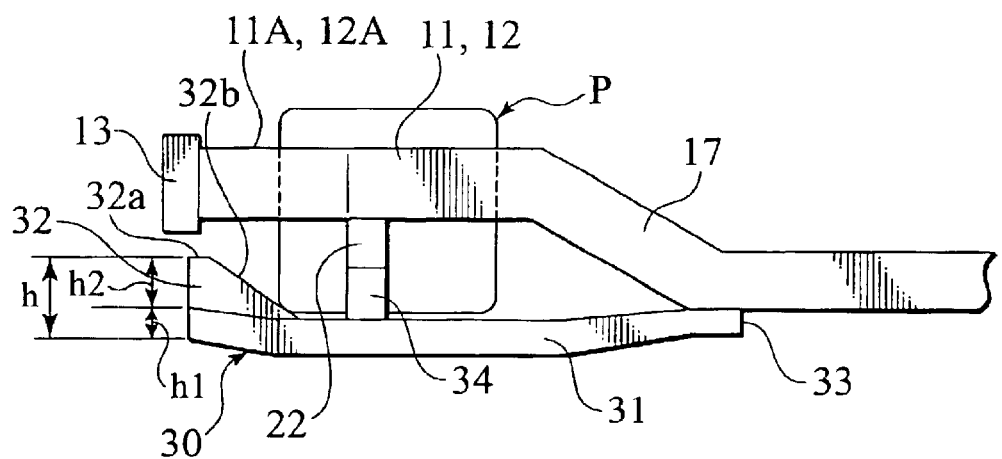
FIG. 19 is a side view showing the a frame structure of the vehicle front portion in the second embodiment in the present invention.
Figure 20:
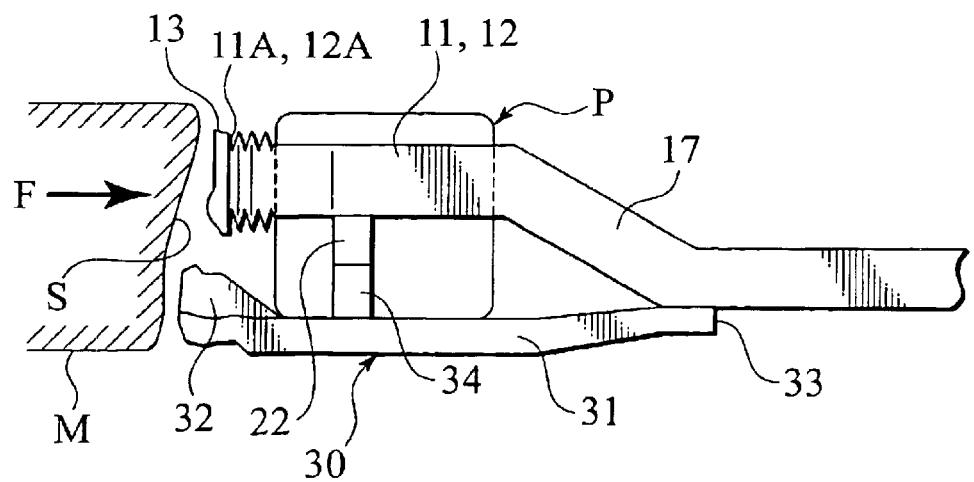
FIG. 20 is a side view showing the frame structure of the vehicle front portion in a collision in the second embodiment of the present invention.

FIGS. 18 to 20 show a second embodiment of the present invention. Regarding FIGS. 18 to 20, redundant explanation is omitted by using like reference numbers for members similar to those members in the first embodiment.

FIG. 18 is an exploded perspective view showing a frame structure of the vehicle front portion. FIG. 19 is a side view showing a frame structure of the vehicle front portion. FIG. 20 is a side view showing a frame structure at a collision of the vehicle front portion.

As shown in FIGS. 18, 19, the main point of the second embodiment differs from the first embodiment in that the front member 32 connecting the front end portions of the pair of side members 13 of the sub frame 30 has a vehicle front side with a height h larger than a vehicle rear side of the front member 32.

As shown in FIG. 19, concretely, the front member 32 has the vehicle front side with a height h larger than the height h1 corresponding to the height of the side member 31 by the height h2. The front member 32 is provided with a top face 32a connected with the upper face of the side member 31 by a slant face 32b.

In this second embodiment of the vehicle front structure, since the front member 32 has the vehicle front side with the height h, the contact area of the front member 32 with the opposite vehicle M is large. Thus, as shown in FIG. 20, since a collision face S formed on the front of the outward bent portions 11A, 12A becomes larger when the opposite vehicle M collapses at the collision, the collision load F can be efficiently transmitted from the bumper reinforcement 13 to the outward bent portions 11A, 12A in the axial direction. Thus, the outward bent portions 11A, 12A can steadily axially collapse improving the efficiency of absorbing collision energy.

Figure 21:
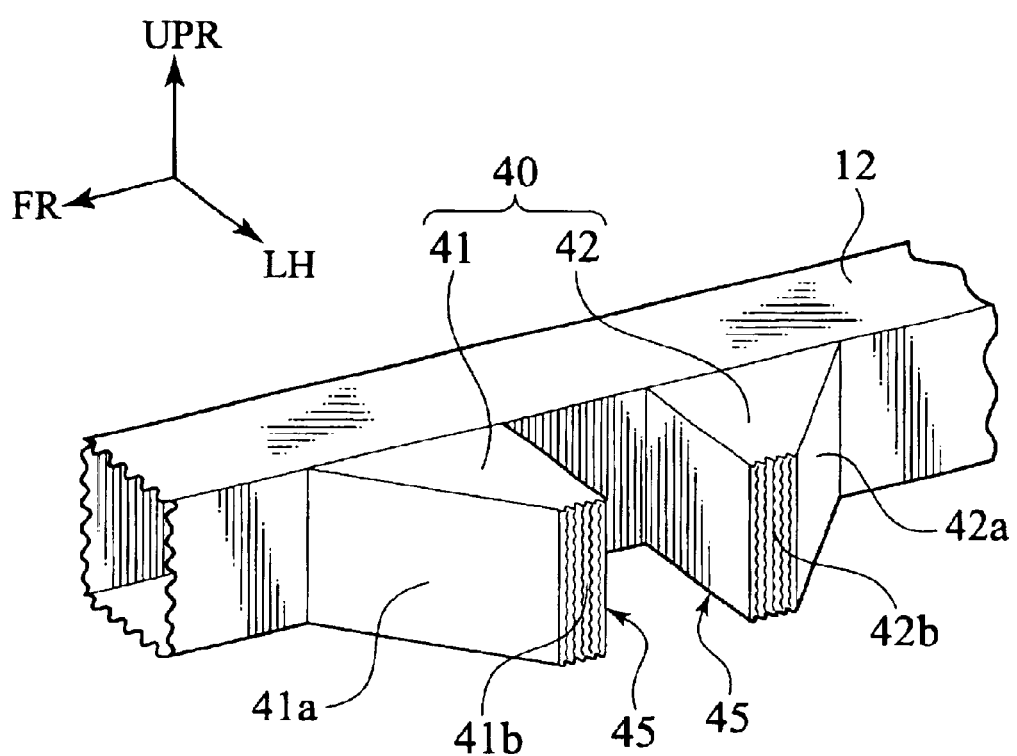
FIG. 21 is an enlarged perspective view showing a mount bracket in a third embodiment.

FIG. 21 shows a third embodiment of the present invention. Regarding FIG. 21, redundant explanation is omitted by using like reference numbers for like members.

FIG. 21 is a enlarged perspective view of the mount bracket 40. In the third embodiment, the front side member 41 and the rear side member 42 constituting the mount bracket 40 are provided with interference surfaces 41b, 42b, respectively. Each interference surfaces 41b, 42b has a friction contact portion 45 for increasing friction force. The friction contact portion 45 is provided with small projections and recesses formed on the interference surfaces 41b, 42b.

In the third embodiment of the vehicle front structure, the mount bracket 40 is provided with the interference surfaces 41b, 42b with the friction contact portion 45. Thus, when the front side member 12 receives the collision load F through the outward bent portion 12A so that the mount bracket 40 abuts on the power unit P at the interference surfaces 41b, 42b, the friction contact portion 45 can make larger the coefficient of friction of the interference surface between the mount bracket 40 and the power unit P to restrict slipping. Thus, the load transmission efficiency from the front side member 12 to the power unit P can be improved.

Figure 22:
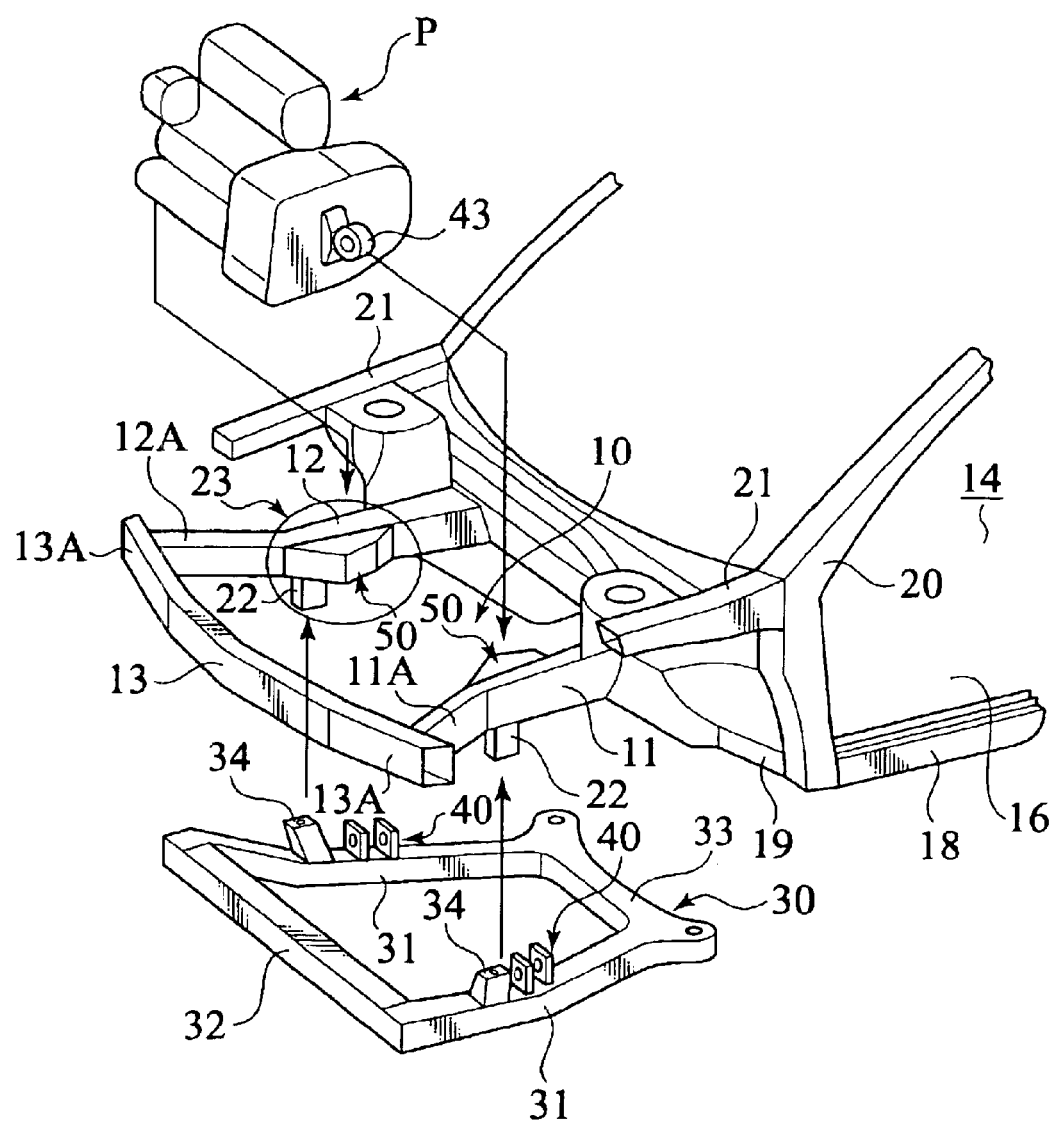
FIG. 22 is an exploded perspective view showing a frame structure of a vehicle front portion in the present invention.
Figure 23:
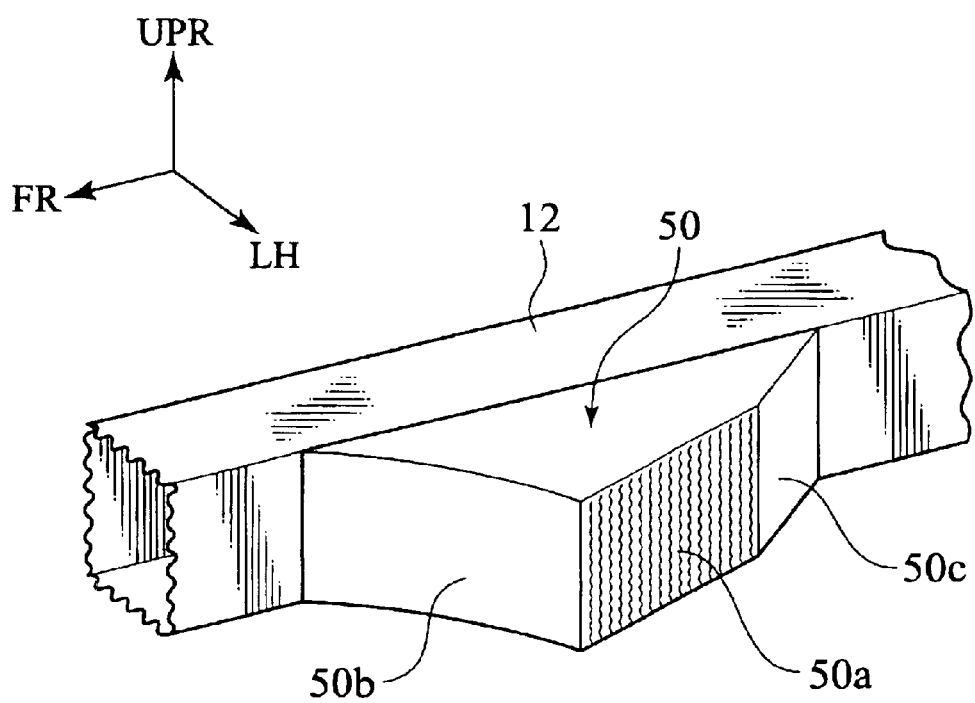
FIG. 23 is an enlarged perspective view showing a portion 17 in a fourth embodiment in the present invention.
Figure 24:
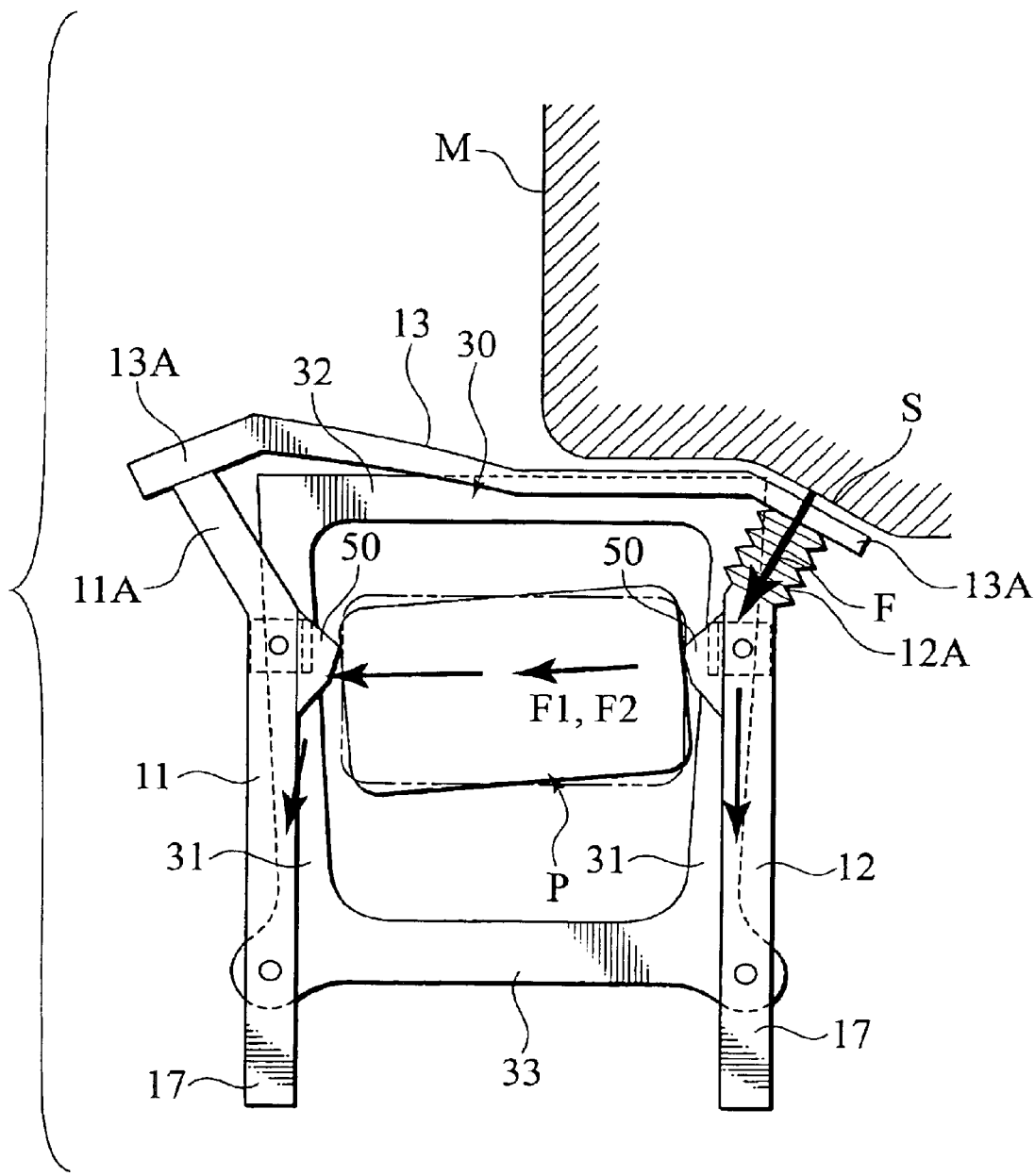
FIG. 24 is a plan view showing a frame structure of a vehicle front portion at a collision in the fourth embodiment in the present invention.

FIGS. 22 to 24 shows a fourth embodiment of the present invention. Regarding FIGS. 22 to 24, a redundant explanation is omitted by using like reference numbers for members similar to those in the first embodiment.

FIG. 22 is an exploded perspective view showing a frame structure of a vehicle front portion. FIG. 23 is an enlarged view of the portion denoted with H in FIG. 22. FIG. 24 is a plan view showing the frame structure of the vehicle front portion in a collision.

The main point of the fourth embodiment different from the first embodiment is that the front side member 11, 12 are provided with an interference member 50 with the power unit P. The interference member 50 is provided with a slant interference surface 50a coming in contact with the power unit P.

In the fourth embodiment, the interference members 50 are different to the mount brackets 40 shown in FIG. 22. The interference members 50 are formed on the front side members 11, 12, and the mount brackets 40 are formed on the sub frame 30. The mount brackets 40 are arranged on the sub frame 30, and the power unit P is supported by the sub frame 30. Thus, the interference members 50 are formed to transmit the deformation force F1, F2 from the front side member 11, 12 to the power unit P.

As shown in FIG. 23, the interference members 50 are provided with front and side faces 50b, 50c. The width between the front and side faces 50b, 50c increases toward the outside in the vehicle width direction to form a substantially trapezoidal shape in the plan view. Each interference member 50 is formed with a slant interference surface 50a on the inner side of the interference member 50. The slant interference surface 50a is slanted outward from the vehicle front side to the vehicle rear side.

Thus, in the fourth embodiment, as shown in FIG. 24, the collision load F transmitted from the outward bent portion 12A to the front side member 12. When the front side member 12 deforms inward in the vehicle width direction, the interference member 50 presses the power unit P at the slant interference surface 50a. Thus, the power unit P is forced to be inclined along the slant interference surface 50a.

Thus, the load F transmitted from the outward bent portion 12A can be transmitted from the slant interference surface 50a of the interference member 50 to the power unit P through a plane. Thus, the transmitting efficiency from the power unit P to the front side member 11 which is arranged on non-collision side can be improved so that the load disperse function can be improved.

Of course, in the fourth embodiment, if the interference member 50 is provided with the slant interference surface 50a with the friction interference surface 45, then the same effects can be obtained as those of the third embodiment.

FIGS. 25 to 28 show a fifth embodiment of the present invention. As to FIGS. 25 to 28, a redundant explanation is omitted by using like reference numbers for like members as the first embodiment.

Figure 25:
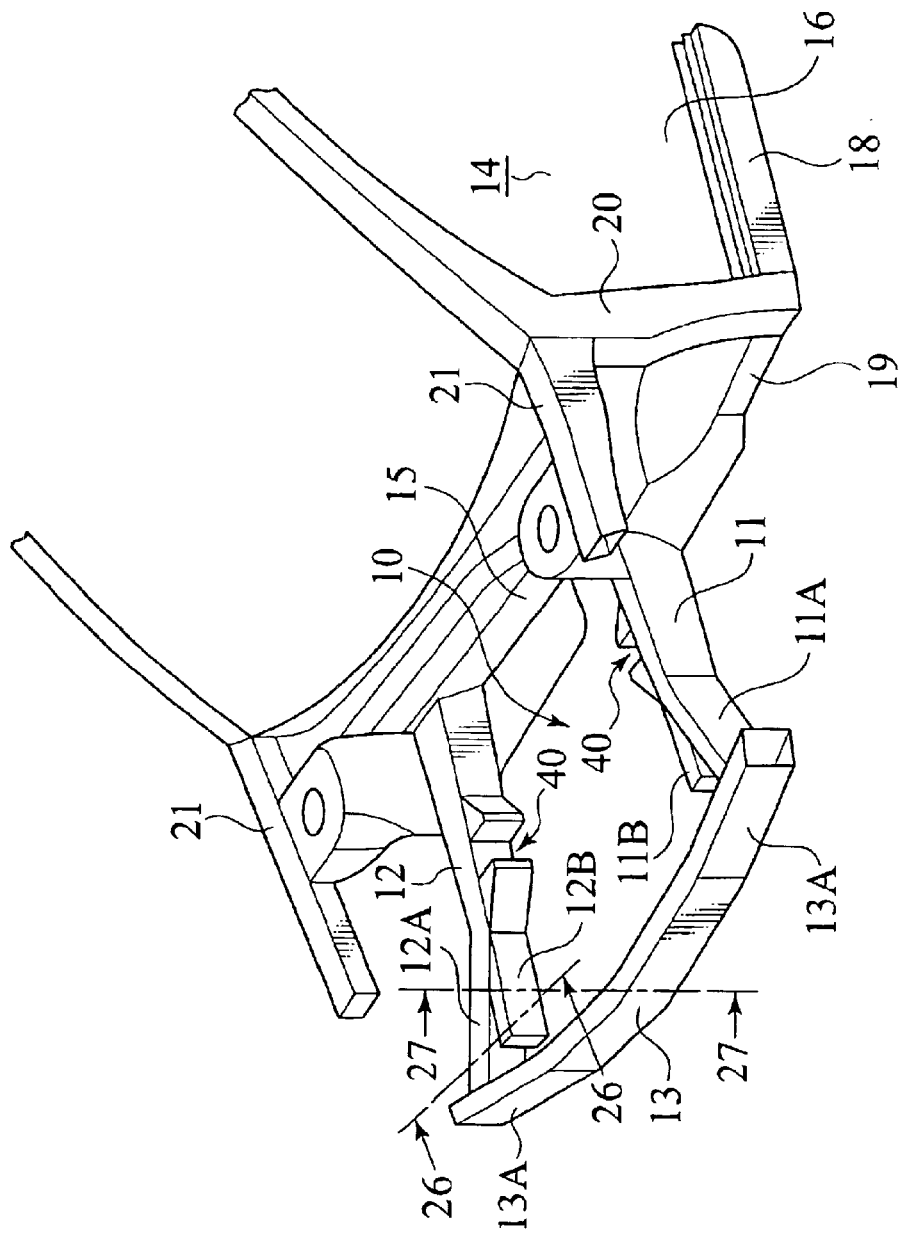
FIG. 25 is a perspective view showing a main portion in a frame structure of a vehicle front portion in a fifth embodiment in the present invention.
Figure 26:
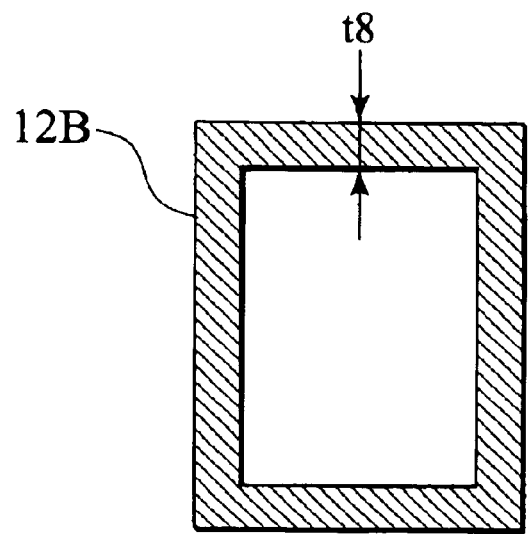
FIG. 26 is an enlarged cross sectional view taken along the line 26—26 in FIG. 25.
Figure 27:
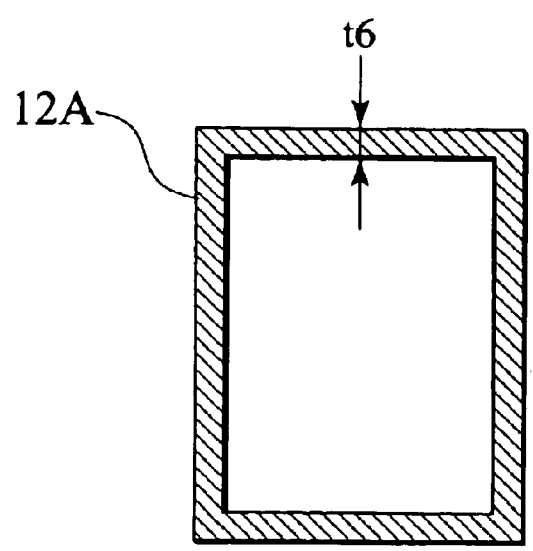
FIG. 27 is an enlarged cross sectional view taken along the line 27—27 in FIG. 25.
Figure 28:
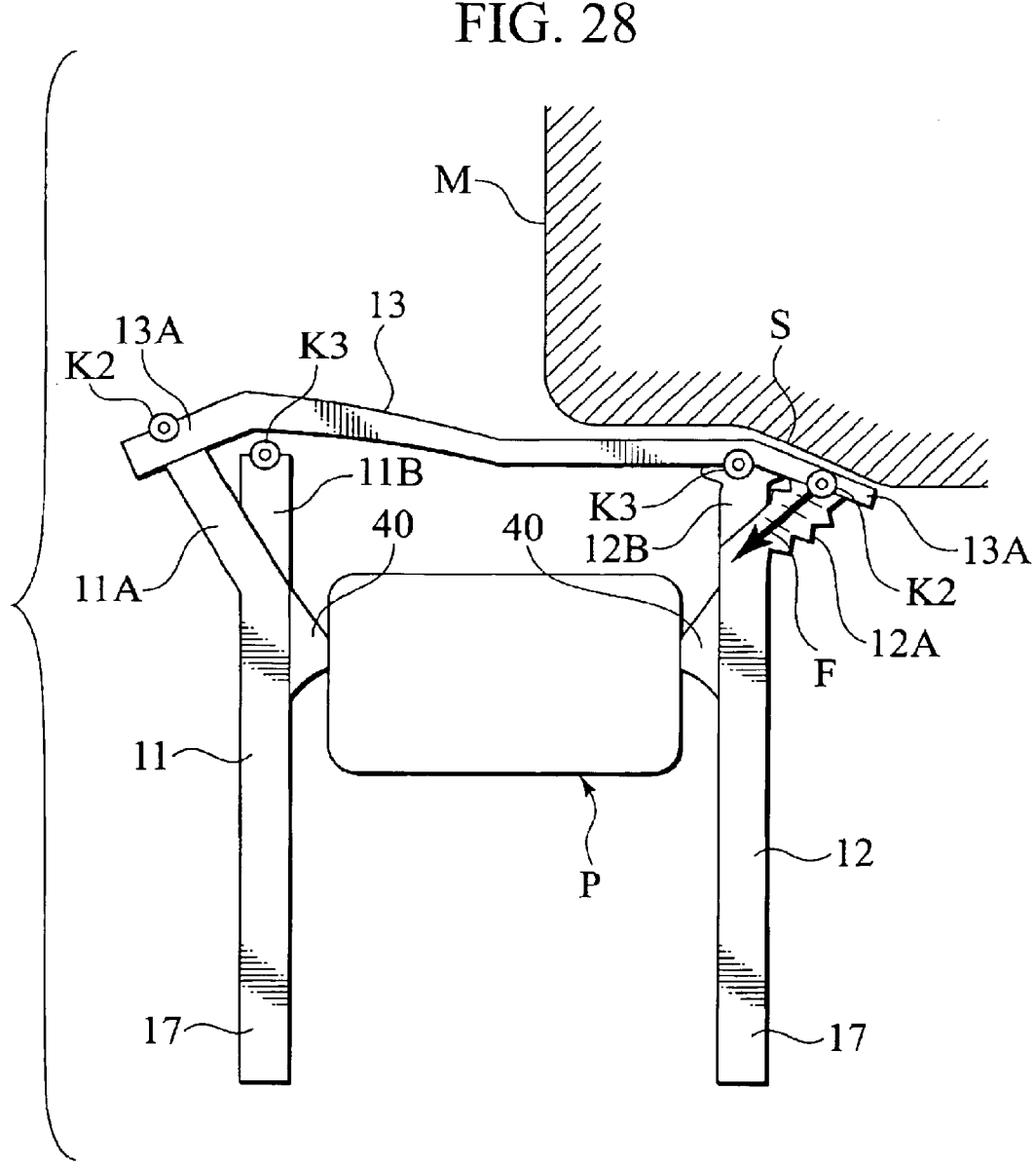
FIG. 28 is a plan view showing a frame structure of a vehicle front portion at a collision in the fifth embodiment in the present invention.

FIG. 25 is a perspective view showing a frame structure of a vehicle front portion. FIG. 26 is an enlarged cross sectional view taken along the line 26—26 in FIG. 25. FIG. 27 is an enlarged cross sectional view taken along the line 27—27 in FIG. 25. FIG. 28 is a plan view showing the frame structure of the vehicle front portion at a collision.

The main point of the fifth embodiment different from the first embodiment is that the front side members 11, 12 are provided with a straight extensions 11B, 12B at the front side of the front side members 11, 12, as shown in FIG. 25. The straight extensions 11B, 12B of straight members form a forked shape with the outward bent portion 11A, 12A, respectively.

The straight extensions 11B, 12B extend straight frontward from the proximal portion 11Ab, 12Ab. The front end positions K3 of the straight extensions 11B, 12B are arranged on the rear side of the front end portions K2 of the outward bent portions 11A, 12A.

While the straight extensions 11B, 12B have a rectangular cross section with a wall thickness t8, the outward bent portions 11A, 12A have a rectangular cross section with a wall thickness t6, similar to the first embodiment as shown in FIG. 27. The straight extensions 11B, 12B have the wall thickness t8 larger than the wall thickness t6 of the outward bent portions 11A, 12A (t8>t6), so that the strength of the straight extensions 11B, 12B is larger than the strength of the outward bent portions 11A, 12A.

In this vehicle front structure of the fifth embodiment, as shown in FIG. 28, when the right side of the bumper reinforcement 13 is pressed due to the collision load F from the substantial front side, the front end K3 of the straight extension 12B becomes a fulcrum. Thus, the bumper reinforcement 13 is bent so that the opposite vehicle M with the rearward slanting portion 13A of the bumper reinforce 13 forms a collision face S substantially perpendicular to the outward bent portion 12A. Thus, the collision load F acts on the outward bent portion 12A in the axial direction.

Thus, in the fifth embodiment, the straight extension 12B has the same function as that of the side member 31 of the sub frame 30 in the first embodiment. The straight extension 12B can be used instead of the side member 31, so that the sub frame 30 becomes unnecessary, lightening the vehicle body.

In addition, in the first to fifth embodiments, though the collision load F acts on the right front side member 12, of course, the collision load F may act on the left front side member 11. In this case, the transmission course of the load is identical to the first to fifth embodiments and the same function and effects can be obtained.

Though the present invention has been explained with the first and fifth embodiments, the present invention is not limited to these embodiments and can be modified within the concept of the present invention.

Japanese Patent Application No. 2002-25456 is expressly incorporated herein by reference in its entirety.

What is claimed is:

1. A vehicle front structure comprising:
   a pair of right and left front side members disposed on right and left sides of a vehicle front compartment and extending in vehicle fore and aft directions, each front side member having an outward bent portion;
   a bumper reinforcement connecting front ends of the front side members, having rearward slanting portions formed on both ends in a vehicle width direction, and connecting with front ends of the outward bent portions;
   a pair of right and left straight members extending in the vehicle fore and aft directions along with the front side members;
   a power unit disposed between the front side members; and
   a pair of interference members disposed on rear sides of proximal portions of the front side members, respectively, the interference members abutting on the power unit as the front side members deforming inward,
   wherein first front end positions of the straight members are arranged on an inside in the vehicle width direction and on a rear side in the vehicle fore and aft direction of second front end positions of the outward bent portions, a strength of the straight members being larger than that of the outward bent portions.

2. The vehicle front structure as claimed in claim 1, wherein the interference member comprises a mount bracket for the power unit.

3. The vehicle front structure as claimed in claim 1, wherein the interference member has a trapezoidal shape in which a width of the interference member increases outward in the vehicle width direction.

4. The vehicle front structure as claimed in claim 1, wherein the interference member has an interference surface with the power unit, the interference surface formed with a friction contact portion which increases a frictional force.

5. The vehicle front structure as claimed in claim 1, wherein the outward bent portion has a strength changing structure in which a strength becomes larger rearward.

6. The vehicle structure as claimed in claim 1, wherein the interference member has an interference surface abutting on the power unit, the interference surface slanted outward in the vehicle width direction and rearward in the vehicle fore and aft direction.

7. The vehicle structure as claimed in claim 1, wherein the rearward slanting portion connects with the outward bent portion at a substantially right angle.

8. The vehicle structure as claimed in claim 1, wherein the straight member comprises a pair of right and left side members of a sub frame connected to an under side of the front side member.

9. The vehicle structure as claimed in claim 8, wherein connecting portions connecting the sub frame to the front side member are arranged close to the interference member.

10. The vehicle structure as claimed in claim 8, wherein front ends of the pair of right and left side members of the sub frame are connected with a front member, a height of front side of the front member is larger than a height of rear side of the front member.

11. The vehicle structure as claimed in claim 1, wherein the straight member comprises a straight extension disposed on a front side of the front side member, the straight extension extending frontward from a proximal portion of the outward bent portion, to form a forked shape with the outward bent portion.

12. A vehicle front structure comprising:
    front side member means disposed on right and left sides of a front compartment and extending in vehicle fore and aft directions, each front side member means having an outward bent portion;
    bumper reinforcement means connecting front end of the front side member means, having rearward slanting portions formed on both ends in a vehicle width direction, and connecting with front ends of the outward bent portions;
    straight member means extending in vehicle fore and aft directions along with the front side member means;
    a power unit disposed between the front side members; and
    interference means for abutting on the power unit as the front side member means deforming inward, the interference means disposed on rear sides of proximal portions of the front side member means, respectively,
    wherein first front end positions of the straight member means are arranged on an inside in the vehicle width direction and on a rear side in the vehicle fore and aft direction of second front end positions of the outward bent portions, a strength of the straight member means being larger than that of the outward bent portions.

13. Method for manufacturing a vehicle front structure, comprising:
    preparing a pair of right and left front side members disposed on right and left sides of a vehicle front compartment and extending in a vehicle fore and aft direction, each front side member having an outward bent portion;
    connecting front ends of the outward bent portions of the front side members with a bumper reinforcement, the bumper reinforcement having rearward slanting portions formed on both ends in a vehicle width direction;
    preparing a pair of right and left straight members extending in the vehicle fore and aft direction along the front side members;
    arranging a power unit between the front side members;
    forming a pair of interference members on rear sides of proximal portions of the front side members, respectively, the interference members abutting on the power unit as the front side members deform inward;
    arranging first front end positions of the straight members on an inside in the vehicle width direction and a rear side in vehicle fore and aft directions of second front end positions of the outward bent portions; and
    setting a strength of the straight members to be larger than that of the outward bent portions.

* * * * *